US009284004B2

(12) United States Patent
Inoue et al.

(10) Patent No.: US 9,284,004 B2
(45) Date of Patent: Mar. 15, 2016

(54) SEAT SUPPORT STRUCTURE FOR SADDLE-RIDING TYPE VEHICLE HAVING RIDER'S SEAT AND SEPARATE PILLION SEAT

(71) Applicant: HONDA MOTOR CO., LTD., Minato-Ku, Tokyo (JP)

(72) Inventors: Yoshihiro Inoue, Wako (JP); Mitsuya Kawamura, Wako (JP); Mizuki Yamauchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 14/467,253

(22) Filed: Aug. 25, 2014

(65) Prior Publication Data
US 2015/0061334 A1    Mar. 5, 2015

(30) Foreign Application Priority Data

Aug. 29, 2013    (JP) ................................. 2013-178018

(51) Int. Cl.
| | | |
|---|---|---|
| *B62J 1/00* | (2006.01) | |
| *B62J 1/14* | (2006.01) | |
| *B62J 1/12* | (2006.01) | |

(52) U.S. Cl.
CPC ..... *B62J 1/14* (2013.01); *B62J 1/12* (2013.01)

(58) Field of Classification Search
CPC ...................................... B62J 1/14; B62J 1/12
See application file for complete search history.

(56) References Cited

U.S. PATENT DOCUMENTS

| | | | | |
|---|---|---|---|---|
| 6,070,896 A * | 6/2000 | Saiki | ........................... | B62J 1/14 280/288.4 |
| 6,648,408 B1 * | 11/2003 | Grove | ......................... | B62J 1/14 297/195.13 |
| 7,556,114 B2 * | 7/2009 | Hanagan | .................... | B62J 1/12 180/219 |
| 7,571,921 B1 * | 8/2009 | Hoeve | ........................ | B62J 1/14 180/219 |
| 7,837,260 B2 * | 11/2010 | Hein | ........................... | B62J 1/12 297/195.12 |
| 8,225,972 B2 * | 7/2012 | Butkiewicz | ................ | B62J 1/14 224/413 |
| 2012/0126589 A1 * | 5/2012 | Kawatani | ................... | B62J 1/14 297/195.12 |

FOREIGN PATENT DOCUMENTS

JP             3504460 B2       3/2004

* cited by examiner

*Primary Examiner* — Philip Gabler
(74) *Attorney, Agent, or Firm* — Carrier Blackman & Associates, P.C.; Joseph P. Carrier; Anne G. Sabourin

(57) ABSTRACT

A seat support structure for a saddle-riding vehicle having a rider's seat and a pillion seat separate from and disposed posterior to the rider's seat includes a bracket disposed on the rider's seat which is fixed to a vehicle body, the bracket providing a coupling between the rider's seat and the pillion seat, wherein the bracket is detachably inserted in a front portion of the pillion seat when the pillion seat is mounted to the vehicle body, and the pillion seat has a rear portion removably secured to the vehicle body.

14 Claims, 7 Drawing Sheets

SEAT SUPPORT STRUCTURE FOR SADDLE-RIDING TYPE VEHICLE HAVING RIDER'S SEAT AND SEPARATE PILLION SEAT

CROSS-REFERENCE TO RELATED APPLICATIONS

The present invention claims priority under 35 USC 119 based on Japanese patent application No. 2013-178018, filed on Aug. 29, 2013. The entire subject matter of this priority document, including specification claims and drawings thereof, is incorporated by reference herein.

BACKGROUND OF THE INVENTION

1. Field of the Invention

The present invention relates to a seat support structure for a saddle-riding type vehicle having a rider's seat and a separate pillion seat. The seat support structure includes a bracket disposed on the rider's seat fixed to a vehicle body, wherein the bracket provides a connection between the rider's seat and the pillion seat which is disposed posterior to the rider's seat.

2. Background Art

Japanese Patent No. 3504460 discloses an arrangement in which a rider's seat has a bracket fixed to a bottom plate thereof, wherein the bracket is also fastened to a bottom plate of a pillion seat from below the pillion seat, and the pillion seat is removable by disengaging the fastening between the bracket and the bottom plate of the pillion seat.

Problem to be Solved by the Invention

The arrangement disclosed in Japanese Patent No. 3504460 allows the rider's seat and the pillion seat, which are connected to each other via the bracket, to be removed from and attached to the vehicle body. However, steps to remove and attach the pillion seat are complicated.

SUMMARY OF THE INVENTION

The present invention has been made in view of the foregoing situation and it is an object of the present invention to provide a seat support structure for a saddle-riding type vehicle which facilitates removal and reinstallation of a pillion seat.

To achieve the foregoing object, according to a first aspect of the present invention there is provided a seat support structure in a saddle-riding type vehicle having a rider's seat and a pillion seat separate from and disposed posterior to the rider's seat, the seat support structure including a bracket disposed on the rider's seat which is fixed to a vehicle body, the bracket providing a coupling between the rider's seat and the pillion seat, wherein the bracket is detachably inserted in a front portion of the pillion seat when the pillion seat is mounted to the vehicle, and the pillion seat has a rear portion removably disposed on the vehicle body.

According to a second aspect of the present invention, in addition to the first aspect, the bracket has a plate shape, is removably disposed on the rider's seat, and includes a rearward extension extending rearwardly from the rider's seat, and the pillion seat has a hook disposed at a lower portion of a front portion thereof, the rearward extension being insertable in the hook from a front of the hook.

According to a third aspect of the present invention, in addition to the second aspect, the pillion seat includes a bottom plate formed of a synthetic resin and a cushion section that covers the bottom plate from above, the hook is disposed on a lower surface of the bottom plate, and the hook receives a rear end portion of the rearward extension inserted therein from the front of the hook.

According to a fourth aspect of the present invention, in addition to the third aspect, the rearward extension includes an upwardly protruding engagement protuberance formed at a rear end of the rearward extension by bending the rear end of the rearward extension upwardly, the hook is disposed on a lower surface of the bottom plate and has a hook bottom wall disposed below the bottom plate so as to form an opening between the hook bottom wall and the lower surface of the bottom plate, the opening opens in a longitudinal direction of the vehicle so as to allow the rear end portion of the rearward extension including the engagement protuberance to be inserted therethrough, and the bottom plate includes a lock protuberance disposed posterior to the hook, the lock protuberance being formed in a protruding condition on the lower surface of the bottom plate such that the engagement protuberance protruding rearwardly from the hook is engaged with a rear surface of the lock protuberance.

According to a fifth aspect of the present invention, in addition to any one of the second to fourth aspects, the bracket includes a pair of left and right rearward extensions disposed on opposite lateral sides of the bracket, wherein each of the extensions is formed into a flat plate longer in the vehicle longitudinal direction than in a vehicle width direction.

According to a sixth aspect of the present invention, in addition to any one of the first to fifth aspects, the rider's seat has a rear portion fixed to the vehicle body via a rider's seat bracket which is jointly fixed to the vehicle body with the bracket.

Effects of the Invention

In the first aspect of the present invention, the bracket disposed on the rider's seat is inserted detachably in the front portion of the pillion seat and the rear portion of the pillion seat is removably disposed on the vehicle body. This allows the pillion seat to be removed by removing the pillion seat from the bracket with the rear portion of the pillion seat disengaged from the vehicle body. When the pillion seat is to be mounted, the foregoing arrangement allows the rear portion of the pillion seat to be mounted on the vehicle body with the bracket inserted in the front portion of the pillion seat. This facilitates independent removal and reinstallation of the pillion seat.

With the second aspect of the present invention, the bracket including the rearward extension can be removed from the rider's seat. When only the rider's seat is to remain on the vehicle body with the pillion seat removed, therefore, the bracket is removed from the rider's seat to thereby enhance appearance. Further, because the bracket is formed into a plate shape, this can achieve cost reduction.

With the third aspect of the present invention, the hook into which the rear end portion of the rearward extension can be inserted from the front is disposed on the bottom plate of the pillion seat. Thus, a condition of the front portion of the pillion seat being supported on the bracket by the insertion of the rearward extension can be favorably maintained.

With the fourth aspect of the present invention, the engagement protuberance is formed by bending the rear end of the rearward extension upwardly. The engagement protuberance can thus be easily formed. Additionally, the hook is disposed on the lower surface of the bottom plate of the pillion seat so as to form the opening between the hook bottom wall and the lower surface of the bottom plate, with the opening extending in the longitudinal direction so as to allow the rear end portion of the rearward extension including the engagement protuberance to be inserted therethrough. The lock protuberance is formed in a protruding condition on the lower surface of the bottom plate on the rear side of the opening so as to allow the engagement protuberance to be engaged with a rear surface of the lock protuberance. Thus, raising the front portion of the pillion seat causes the hook bottom wall to bend the rear end portion of the rearward extension upwardly so as to form the opening, resulting in the engagement protuberance being engaged with the lock protuberance. Thus, the bracket cannot be unintentionally removed from the hook. This allows the support of the pillion seat to be favorable.

With the fifth aspect of the present invention, the left and right rearward extensions are disposed on the respective right and left lateral sides of the bracket. This achieves reduction in weight of the bracket. The rearward extensions are each formed into a flat plate longer in the longitudinal direction than in the vehicle width direction. This makes the rearward extensions more flexible and facilitates insertion into the hook.

With the sixth aspect of the present invention, the rear portion of the rider's seat is fixed to the vehicle body via the rider's seat bracket and the rider's seat bracket is jointly fixed to the vehicle body with the bracket. This minimizes the number of points to be fastened, achieving better assembling workability.

For a more complete understanding of the present invention, the reader is referred to the following, non-limiting, detailed description section, which describes an exemplary embodiment of the present invention and should be read in conjunction with the accompanying drawings. Such exemplary embodiment is provided for illustration and better understanding of the present invention and is not intended to limit the invention. Throughout the following detailed description and in the drawings, like numbers refer to like parts.

DETAILED DESCRIPTION OF MODE FOR CARRYING OUT THE INVENTION

A specific, exemplary embodiment to which the present invention is applied will be described below with reference to accompanying FIGS. 1 to 7. Throughout the descriptions given hereunder, longitudinal, lateral, and vertical directions correspond to the directions as viewed from a rider on a motorcycle, which is a type of saddle-riding vehicle to which the present invention may be applied.

Figure 1:
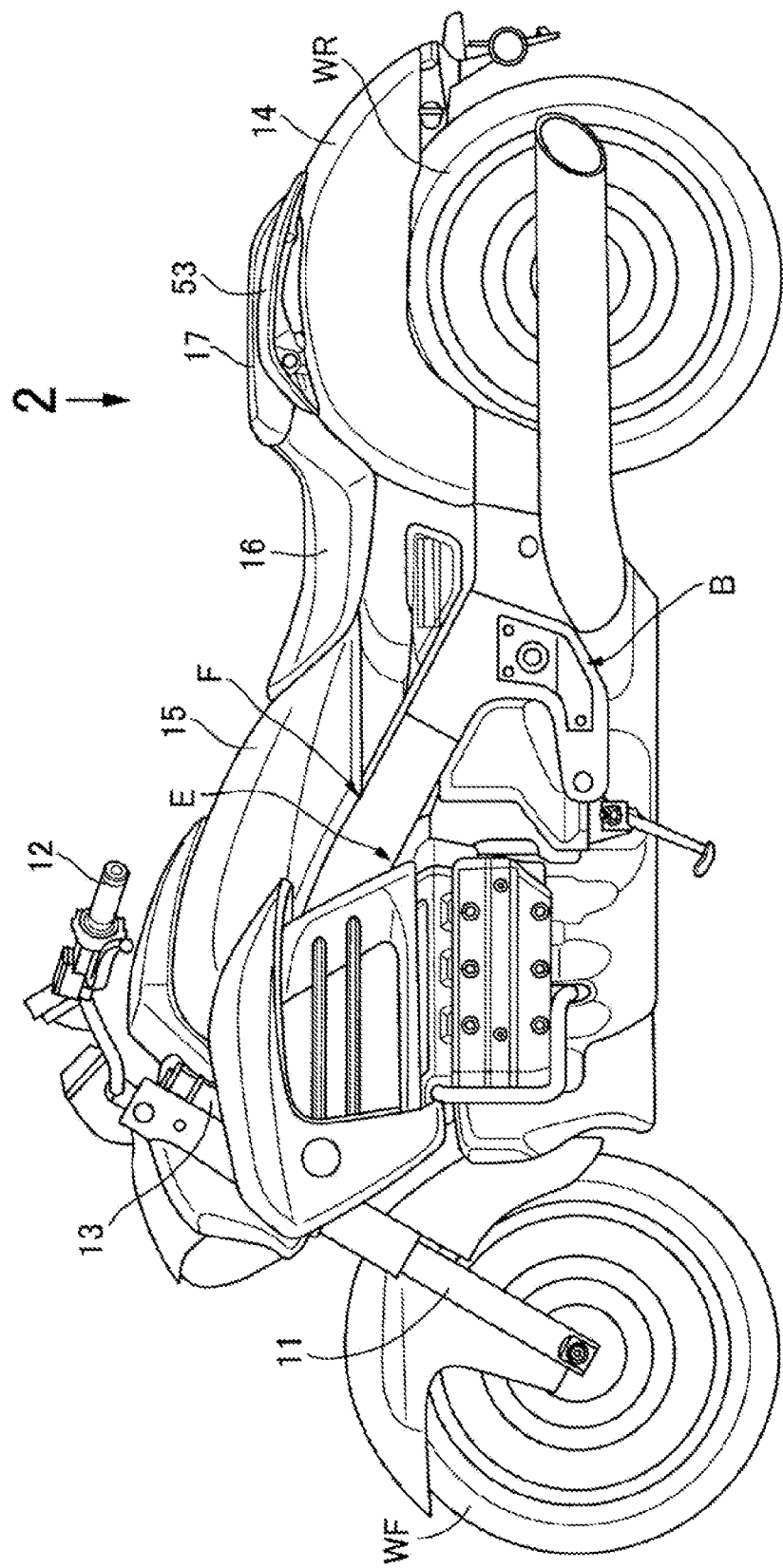
FIG. 1 is a side elevational view showing a motorcycle having a seat support structure according to an exemplary embodiment of the present invention.

Reference is made to FIG. 1. A motorcycle as a saddle-riding type vehicle has a vehicle body B. The vehicle body B includes a vehicle body frame F and a rear fender 14. The vehicle body frame F includes a head pipe 13 disposed at a front end thereof. The head pipe 13 steerably supports a front fork 11 and a steering handlebar 12. The front fork 11 journals a front wheel WF. The rear fender 14 is mounted on a rear portion of the vehicle body frame F so as to cover a rear wheel WR from above.

A multi-cylinder horizontally opposed engine E is disposed posterior to the front wheel WF at a front portion of the vehicle body frame F. A rear wheel WR driven by drive power delivered from the engine E is disposed posterior to the engine E and supported by the vehicle body frame F so as to be vertically oscillatable.

Figure 2:
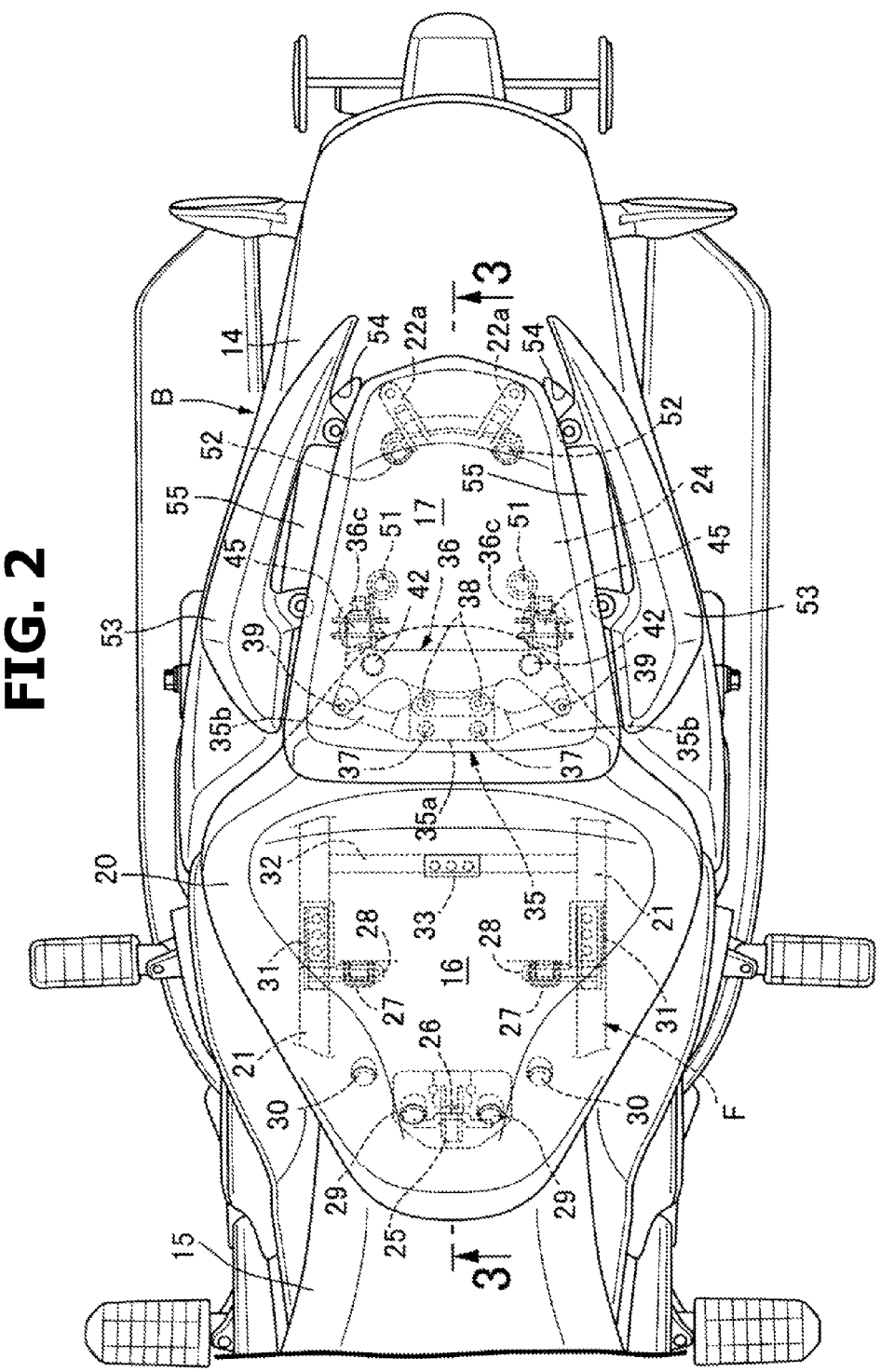
FIG. 2 is a view in the direction of arrow 2 in FIG. 1, with components of the seat support structure shown in broken lines.
Figure 3:
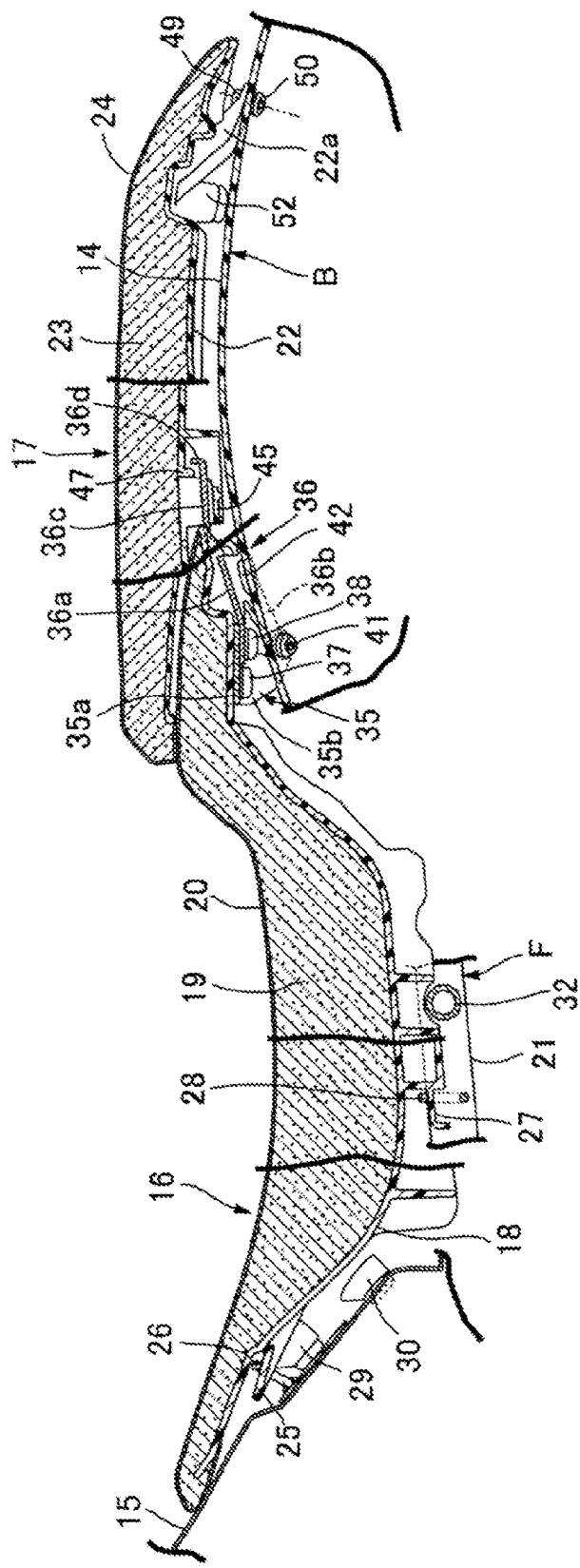
FIG. 3 is a cross-sectional view taken along line 3-3 in FIG. 2.

Reference is also made to FIGS. 2 and 3. A fuel tank 15 disposed above the engine E is mounted at the front portion of the vehicle body frame F. A rider's seat 16 for a rider is disposed posterior to the fuel tank 15. A pillion seat 17 for a pillion passenger formed separately from the rider's seat 16 is disposed posterior to the rider's seat 16.

The rider's seat 16 includes a bottom plate 18 and a cushion section 19. The bottom plate 18 is formed of a hard synthetic resin. The cushion section 19 is covered with a skin 20 and covers the bottom plate 18 from above. The rider's seat 16 has a front portion disposed at such a position as to overlap a rear portion of the fuel tank 15 from above. In addition, the rider's seat 16 has a rear portion disposed so as to cover from above a front portion of the rear fender 14 supported by a pair of left and right rear frames 21 that form part of the vehicle body frame F.

The pillion seat 17 includes a bottom plate 22 and a cushion section 23. The bottom plate 22 may be formed of a hard synthetic resin. The cushion section 23 is covered with a skin 24 and covers the bottom plate 22 from above. The pillion seat 17 has a front portion disposed so as to overlap the rear portion of the rider's seat 16 from above.

Figure 4:
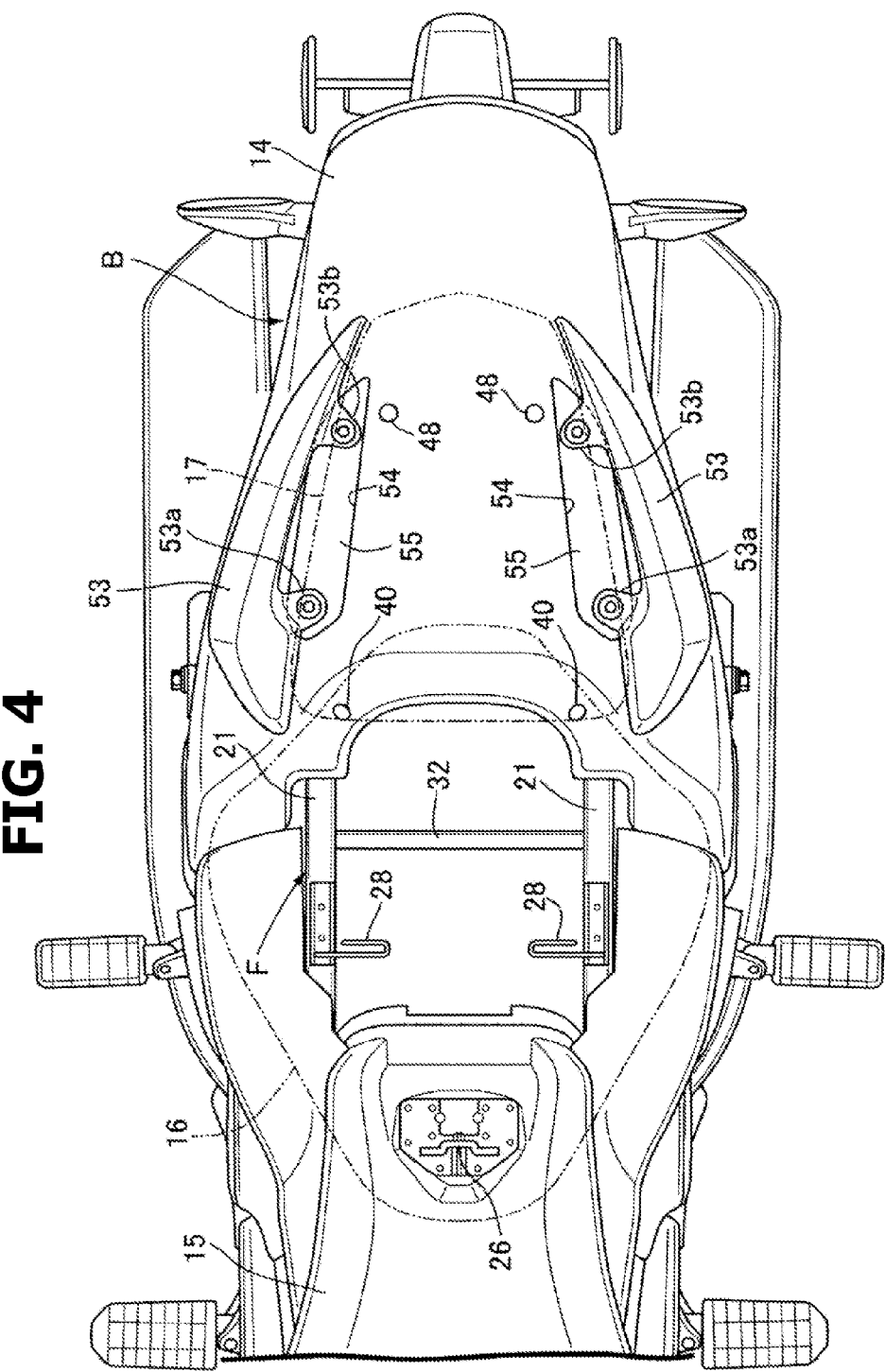
FIG. 4 is a plan view similar to FIG. 2, but showing a condition in which a rider's seat and a pillion seat are removed and outlines thereof shown in broken lines.
Figure 5:
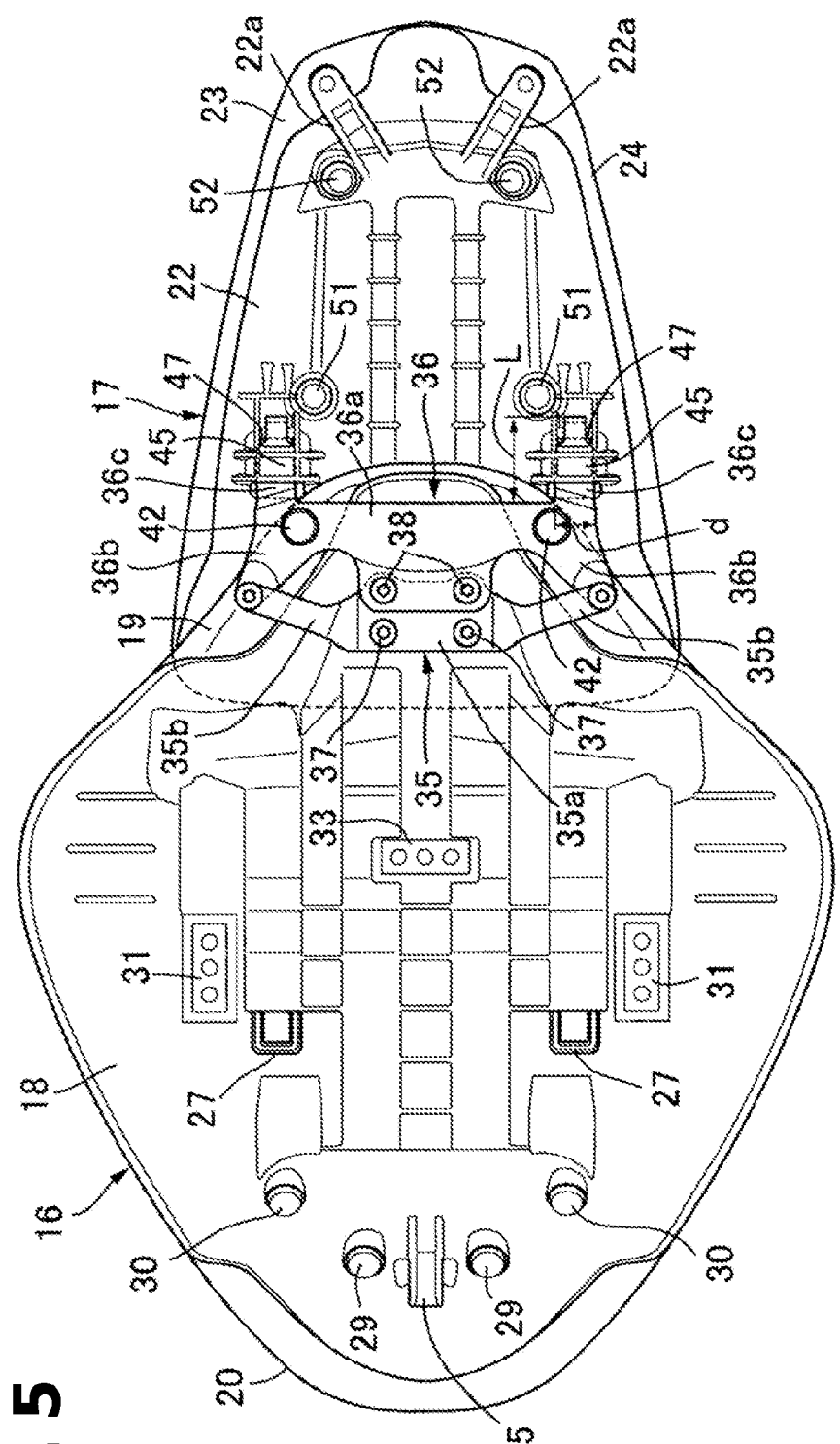
FIG. 5 is a view showing the rider's seat and the pillion seat of the motorcycle of FIG. 1 as viewed from back sides thereof.

Reference is also made to FIGS. 4 and 5. The rider's seat 16 may be fixed to the vehicle body B. The bottom plate 18 of the rider's seat 16 has a rider's seat front hook 25 disposed at a central portion in a width direction on a lower surface at the front portion thereof. The rider's seat front hook 25 is inserted from the rear into a lock 26 fixed to an upper surface at the rear portion of the fuel tank 15 that is fixed to the vehicle body frame F. The bottom plate 18 of the rider's seat 16 further has a pair of left and right rider's seat middle hooks 27 disposed on the lower surface at a middle portion in the vehicle longitudinal direction, the middle hooks 27 being spaced apart from each other. The rider's seat middle hooks 27 are inserted from the rear into locks 28 fixedly disposed on the respective rear frames 21.

Elastic members 29 are fixed to a lower surface of the bottom plate 18 of the rider's seat 16 so as to be disposed on both lateral sides of the rider's seat front hook 25. The elastic members 29 are disposed to abut on an upper surface at the rear portion of the fuel tank 15. A pair of left and right elastic members 30 disposed posterior to the elastic members 29 is fixed to the lower surface of the bottom plate 18 so as to abut on the upper surface at the rear portion of the fuel tank 15. Additionally, a pair of left and right elastic members 31 to be in abutment with the respective rear frames 21 and an elastic member 33 to be in abutment with a cross member 32 connecting the rear frames 21 are fixed to the lower surface of the bottom plate 18 at a middle portion thereof in the vehicle longitudinal direction.

A plate-shaped rider's seat bracket 35 is fixed to the rear portion of the bottom plate 18 of the rider's seat 16. A plate-shaped bracket 36 is removably fitted to the rider's seat bracket 35. The rider's seat 16 has the rear portion thereof jointly fixed to a front portion of the rear fender 14 of the vehicle body B with the rider's seat bracket 35 and the bracket 36.

The rider's seat bracket 35 includes a mounting portion 35a and a pair of left and right mounting arms 35b integrated with each other. The mounting portion 35a has a rectangular shape and is fixed to the rear portion of the bottom plate 18 of the rider's seat 16 at a central portion in the vehicle width direction with a pair of left and right bolts 37. The mounting arms 35b extend outwardly in the vehicle width direction and obliquely rearwardly from the mounting portion 35a. The mounting arms 35b have leading end portions disposed, though protruding laterally from the rear portion of the bottom plate 18 in the rider's seat 16, at positions covered from above at both lateral sides of a rear portion of the cushion section 19 of the rider's seat 16. Specifically, the leading end portions of the mounting arms 35b are disposed at positions exposed to the outside when the both lateral sides of the rear portion of the cushion section 19 are turned upwardly.

The bracket 36 includes a connecting plate 36a, a pair of left and right mounting arms 36b, and a pair of left and right rearward extensions 36c integrated with each other. The connecting plate 36a is removably attached to a rear portion of the mounting portion 35a in the rider's seat bracket 35 with a pair of left and right bolts 38. The mounting arms 36b extend outwardly in the vehicle width direction and obliquely forwardly from both lateral sides of a rear portion of the connecting plate 36a so as to have leading end portions overlapping the leading end portions of the mounting arms 35b. The rearward extensions 36c extend rearwardly from the both lateral sides of the connecting plate 36a.

A bolt 39 is passed through each of the leading end portions of the mounting arms 35b and 36b that overlap each other one on top of another. The rear fender 14 has pass-through holes 40 at the front portion of the rear fender 14. The bolts 39 are passed through the pass-through holes 40 and are threadedly engaged with nuts 41 (see FIG. 3) fixed to a back surface at the front portion of the rear fender 14. This causes the leading end portions of the mounting arms 35b and 36b that vertically overlap each other to be jointly fastened with the bolts 39 disposed substantially in a vertical direction to be thereby fastened to the rear fender 14. Thus, the rider's seat bracket 35 and the bracket 36 are jointly fastened to the rear fender 14.

A pair of left and right elastic members 42 that abut on an upper surface at the front portion of the rear fender 14 with the rear portion of the rider's seat 16 fixed to the vehicle body B is fixed to base portions of the mounting arms 36b of the bracket 36.

The rearward extensions 36c of the bracket 36, when attached to the rider's seat 16 via the rider's seat bracket 35, extend rearwardly from the rider's seat 16. The rearward extensions 36c are each formed into a flat plate longer in the vehicle longitudinal direction than in the vehicle width direction, specifically, having a longitudinal length L greater than a lateral width d.

A rear end portion of the bracket 36, specifically, rear end portions of the rearward extensions 36c on both lateral sides of the bracket 36 are detachably inserted into the front portion of the pillion seat 17, while the pillion seat 17 has the rear portion removably fitted to the rear portion of the rear fender 14 in the vehicle body B.

The bottom plate 22 of the pillion seat 17 has a pair of left and right hooks 45 disposed on a lower surface at the front portion thereof. The pair of left and right rearward extensions 36c can be inserted from the front into the hooks 45.

Figure 6:
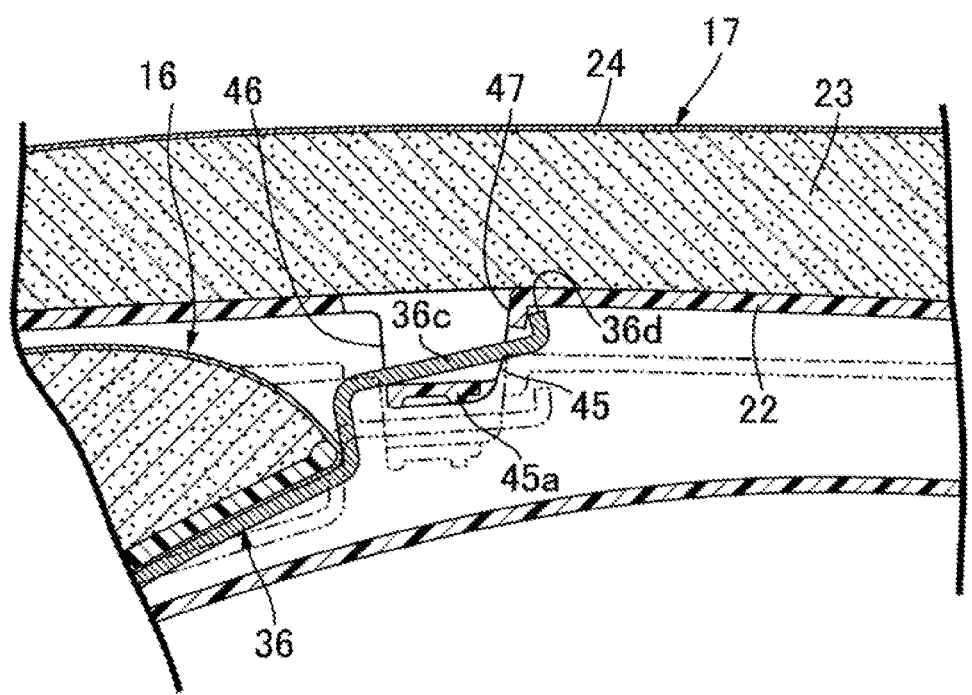
FIG. 6 is an enlarged view showing a main part of what is shown in FIG. 3 with a front portion of the pillion seat raised upwardly.

Reference is also made to FIG. 6. The rearward extensions 36c each have a rear end formed into an upwardly protruding engagement protuberance 36d. The engagement protuberance 36d may be formed by simply bending the rear end of the rearward extension 36c upwardly. The hooks 45 each have a hook bottom wall 45a disposed below the bottom plate 22 of the pillion seat 17. Each of the hooks 45 is disposed on the lower surface of the bottom plate 22 so as to form an opening 46 between the hook bottom wall 45a and the lower surface of the bottom plate 22, the opening 46 extending in the vehicle longitudinal direction so as to allow the rear end portion of the rearward extension 36c including the engagement protuberance 36d to be inserted therethrough. A lock protuberance 47 is formed in the bottom plate and disposed posterior to each of the hooks 45. Each lock protuberance 47 is disposed at a rear side of the hook 45 and is formed in a protruding condition on the lower surface of the bottom plate 22 so as to allow the engagement protuberance 36d protruding rearwardly from the hook 45 to be engaged therewith from the rear.

Through structural settings of the rearward extension 36c, the hooks 45, and the lock protuberances 47, raising the front portion of the pillion seat 17 causes, as shown in FIG. 6, the hook bottom wall 45a to bend the rear end portion of the rearward extension 36c upwardly, resulting in the engagement protuberance 36d being securely engaged with the lock protuberance 47.

A pair of left and right rear portion mounting arms 22a is integrally formed at a rear portion of the bottom plate 22 in the pillion seat 17. The rear portion mounting arms 22a extend outwardly in the vehicle width direction and obliquely rearwardly so as to have rear end portions disposed at positions exposed to the outside when both lateral sides of a rear portion of the cushion section 23 of the pillion seat 17 are turned upwardly. Bolts 49 are passed through the rear end portions of the rear portion mounting arms 22a and pass-through holes 48 formed in the rear portion of the rear fender 14. The bolts 49 are then threadedly engaged with nuts 50 (see FIG. 3) fixed to the back surface at the rear portion of the rear fender 14. This causes the rear portion of the pillion seat 17 to be removably mounted on the rear fender 14 of the vehicle body B.

A pair of left and right elastic members 51 that abut on the upper surface of the rear fender 14 is fixed to the lower surface of the bottom plate 22 of the pillion seat 17. Additionally, a pair of left and right elastic members 52 that abut on the upper surface of the rear portion of the rear fender 14 is fixed to the lower surface of the bottom plate 22 of the pillion seat 17. As depicted, the elastic members 51 may be disposed on the inside of the hooks 45 and the elastic members 52 may be disposed on the outside of the rear portion mounting arms 22a when the rear portion of the bracket 36 mounted on the rider's seat 16 is inserted into the front portion of the pillion seat 17 and the rear portion of the pillion seat 17 is fastened to the rear portion of the rear fender 14 so that the pillion seat 17 is fixed to the vehicle body B.

Grab rails 53 are disposed on both left and right lateral sides of the pillion seat 17 joined to the rider's seat 16 and mounted on the vehicle body B. The rear fender 14 has slot-shaped mounting holes 54 that extend long in the vehicle longitudinal direction. The mounting holes 54 are formed on both lateral sides of the pillion seat 17 and allow the grab rails 53 to be fastened to the rear frames 21 of the vehicle body frame F. The mounting holes 54 are closed by lid members 55. The grab rails 53 each have a pair of front and rear mounting legs 53a and 53b that are fastened to the rear frame 21 via the lid member 55.

Figure 7:
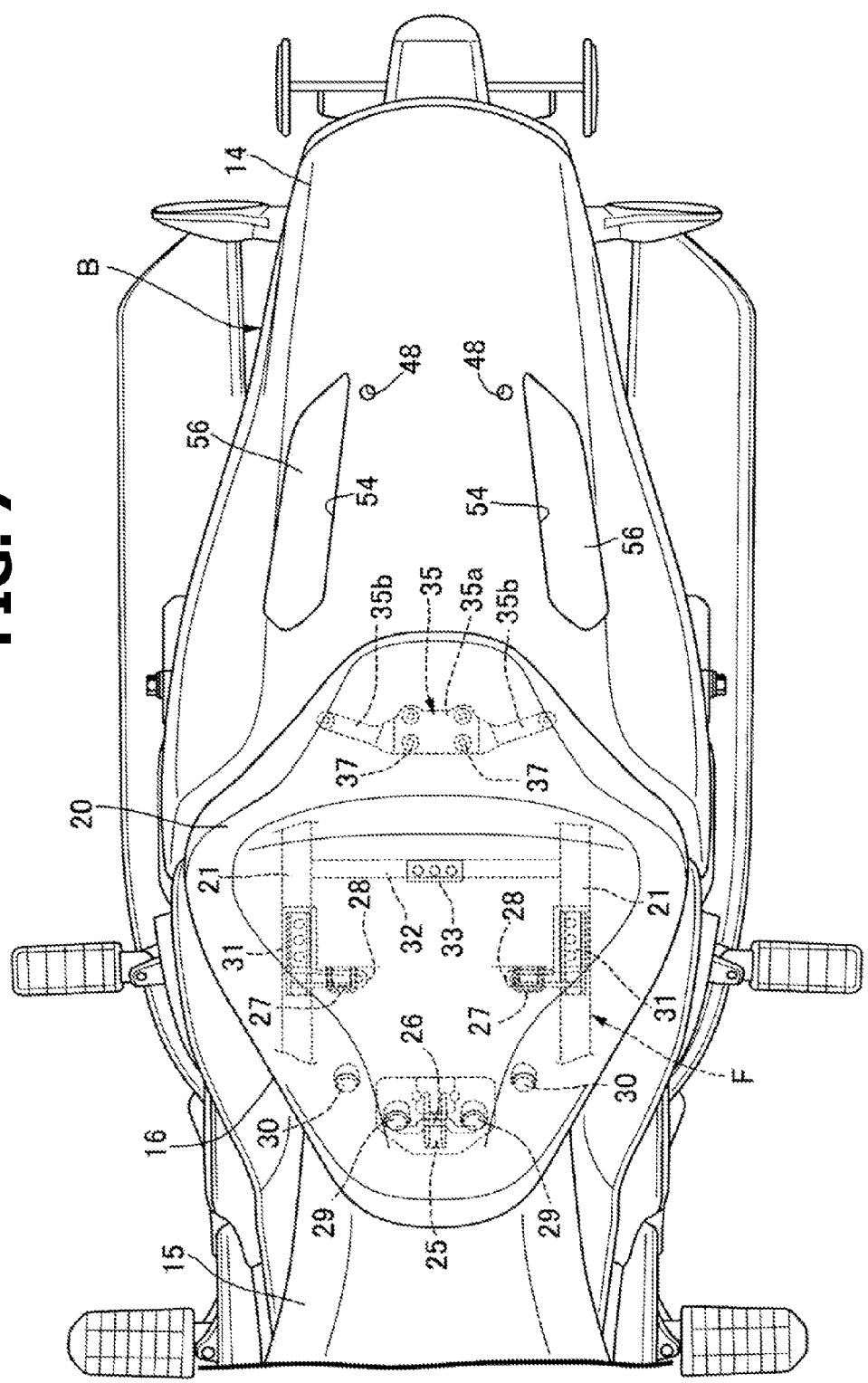
FIG. 7 is a plan view similar to FIG. 2, but showing a condition in which the pillion seat is removed.

Reference is made to FIG. 7. When the pillion seat 17 is to be removed, the bracket 36 is removed from the rider's seat bracket 35 and the grab rails 53 are also removed. After the pillion seat is removed, the mounting holes 54 are closed by lid members 56 different from the lid members 55.

Effects of the embodiment will be described below. The bracket 36 mounted on the rider's seat 16 fixed to the vehicle body B is inserted detachably into the front portion of the pillion seat 17 which is provided separate from the rider's seat 16, and the rear portion of the pillion seat 17 is removably mounted on the rear fender 14 of the vehicle body B. This allows the pillion seat 17 to be removed by removing the pillion seat 17 from the bracket 36 with the rear portion of the pillion seat 17 disengaged from the rear fender 14. When the pillion seat 17 is to be mounted, the foregoing arrangement allows the rear portion of the pillion seat 17 to be mounted on the rear fender 14 with the bracket 36 inserted in the front portion of the pillion seat 17. The arrangement facilitates independent removal and reinstallation of the pillion seat 17.

The plate-shaped bracket 36 removably mounted on the rider's seat 16 includes the rearward extensions 36c that, when attached to the rider's seat 16, extend rearwardly from the rider's seat 16. The hooks 45 into which the rearward extensions 36c can be inserted from the front are disposed on the lower front portion of the pillion seat 17. The bracket 36 including the rearward extensions 36c can thus be removed from the rider's seat 16 when desired. When only the rider's seat 16 is used with the pillion seat 17 removed, therefore, the bracket 36 can be removed from the rider's seat 16 to thereby enhance appearance. The bracket 36, being formed into a plate shape, can also achieve cost reduction.

The pillion seat 17 includes the bottom plate 22 formed of a synthetic resin and the cushion section 23 that covers the bottom plate 22 from above. In addition, the hooks 45 into which the rear end portions of the rearward extensions 36c can be inserted from the front are disposed on the lower surface of the bottom plate 22. Thus, a condition of the front portion of the pillion seat 17 being supported on the bracket 36 by the insertion of the rearward extensions 36c can be favorably maintained.

The engagement protuberances 36d protruding upwardly may be formed at the rear ends of the rearward extensions 36c by bending the rear ends of the rearward extensions 36c upwardly. The hooks 45, each having the hook bottom wall 45a disposed below the bottom plate 22 of the pillion seat 17, are disposed on the lower surface of the bottom plate 22 so as to form the openings 46 between the hook bottom walls 45a and the lower surface of the bottom plate 22, with each of the openings 46 being open or extending in the vehicle longitudinal direction so as to allow the rear end portion of the corresponding rearward extension 36c including the engagement protuberance 36d to be inserted therethrough. The lock protuberances 47 disposed posterior to the hooks 45, are formed in a protruding condition on the lower surface of the bottom plate 22 so as to allow the engagement protuberances 36d protruding rearwardly from the hooks 45 to be engaged therewith from the rear. Thus, as shown in FIG. 6, raising the front portion of the pillion seat 17 causes the hook bottom walls 45a formed in the hooks 45 to bend the rear end portions of the rearward extensions 36c further upwardly when extended through the openings 46, resulting in the engagement protuberances 36d being securely engaged with the lock protuberances 47. Thus, the bracket 36 cannot be unintentionally removed from the hooks 45. This allows the support of the pillion seat 17 to be favorable.

Additionally, the left and right rearward extensions 36c are disposed on the respective lateral sides of the bracket 36. This achieves reduction in weight of the bracket 36. The rearward extensions 36c are each formed into a flat plate longer in the vehicle longitudinal direction than in the vehicle width direction. This makes the rearward extensions 36c more flexible and facilitates insertion into the hooks 45.

In addition, the rear portion of the rider's seat 16 is fixed to the rear fender 14 of the vehicle body B via the rider's seat bracket 35, whereas the bracket 35 is fixed to the rear fender 14 of the vehicle body B through joint fastening with the bracket 36. This minimizes the number of points to be fastened, achieving better assembling workability.

While the present invention has been particularly described with reference to a specific, exemplary embodiment for clarity of understanding, it will be understood that the embodiment is not intended to limit the present invention and various changes in form and detail may be made therein without departing from the spirit and scope of the invention. It is apparent to those who are skilled in the art that various modifications and improvements may be added to the above-mentioned embodiment. It is also apparent from the description and the claims appended hereto that embodiments to which such modifications and improvements are added also fall within the technical scope of the invention.

DESCRIPTION OF REFERENCE SYMBOLS

16: Rider's seat
17: Pillion seat
22: Bottom plate
23: Cushion section
35: Rider's seat bracket
36: Bracket
36c: Rearward extension
36d: Engagement protuberance
45: Hook
45a: Hook bottom wall
46: Opening
47: Lock protuberance
B: Vehicle body

We claim:

1. A seat support structure for a saddle-riding vehicle having a rider's seat and a pillion seat separate from and disposed posterior to the rider's seat, the seat support structure comprising:

a bracket disposed on the rider's seat fixed to a vehicle body, the bracket providing a coupling between the rider's seat and the pillion seat, wherein the bracket is detachably inserted in a front portion of the pillion seat when the pillion seat is mounted to the vehicle body, and the pillion seat has a rear portion removably disposed on the vehicle body, the bracket including a rearward extension extending rearwardly from the rider's seat when the bracket is connected to the rider's seat, the rearward extension including an upwardly protruding engagement protuberance formed at a rear end of the rearward extension, the pillion seat having a bottom plate formed of rigid material and a seat cushion section that covers the bottom plate from above, the plate including a hook disposed on a lower surface at a lower front portion thereof, and the rearward extension is insertable in the hook from a front of the hook, the bottom plate including a lock protuberance disposed posterior to the hook, the lock protuberance being formed in a protruding condition on the lower surface of the bottom plate such that the engagement protuberance protruding rearwardly from the hook opposes a rear surface of the lock protuberance when the pillion seat is mounted to the vehicle body, the hook having a hook bottom wall disposed below the bottom plate so as to form an opening between the hook bottom wall and the lower surface of the bottom plate, the opening extending in the vehicle longitudinal direction so as to allow the rear end of the rearward extension including the engagement protuberance to be inserted therethrough, and wherein when the front portion of the pillion seat is raised out of engagement with the rider's seat while the rear portion of the pillion seat is secured to the vehicle and the rearward extension is extended through the hook opening, the hook bottom wall engages and bends the rear end of the rearward extension upwardly such that the engagement protuberance securely engages with the lock protuberance.

2. The seat support structure for a saddle-riding vehicle according to claim 1, wherein the bracket is plate shaped, and is removably connected to the rider's seat.

3. The seat support structure for a saddle-riding vehicle according to claim 1, wherein the bottom plate is formed of synthetic resin.

4. The seat support structure for a saddle-riding vehicle according to claim 1, wherein the engagement protuberance is formed as an upward bend in the rear end of the rearward extension.

5. The seat support structure for a saddle-riding vehicle according to claim 1, wherein the engagement protuberance is spaced from the lock protuberance when the rear portion of the pillion seat is secured to the vehicle and the front portion of the pillion seat is disposed in engagement with the rider's seat.

6. The seat support structure for a saddle-riding vehicle according to claim 1, wherein the bracket further includes a pair of left and right rearward extensions disposed on opposite lateral sides of the bracket, wherein each of the extensions is formed into a flat plate longer in the vehicle longitudinal direction than in a vehicle width direction, and wherein a bottom plate of the pillion seat includes a pair of hooks which respectively receive rear ends of the pair of rearward extensions therethrough.

7. The seat support structure for a saddle-riding vehicle according to claim 1, wherein the rider's seat has a rear portion fixed to the vehicle body via a rider's seat bracket which is jointly fixed to the vehicle body with the bracket.

8. A seat support structure for a saddle-riding vehicle having a rider's seat and a pillion seat separately connectable to the vehicle with the pillion seat disposed rearwardly of the rider's seat, the seat support structure comprising:

a bracket disposed on the rider's seat fixed to a vehicle body, the bracket providing a coupling between the rider's seat and the pillion seat, wherein the bracket includes a rearward extension extending rearwardly from the rider's seat, wherein the rearward extension includes an upwardly protruding engagement protuberance formed at a rear end of the rearward extension, the pillion seat having a bottom plate formed of a rigid material and a cushion section that covers the bottom plate from above, and the bottom plate having a hook disposed on a lower surface at a lower front portion thereof, and having a hook bottom wall disposed below the bottom plate so as to form an opening between the hook bottom wall and the lower surface of the bottom plate, the opening extending in the vehicle longitudinal direction so as to allow the rear end of the rearward extension including the engagement protuberance to be inserted therethrough, and the bottom plate includes a lock protuberance disposed posterior to the hook, the lock protuberance being formed in a protruding condition on the lower surface of the bottom plate such that the engagement protuberance protruding rearwardly from the hook opposes a rear surface of the lock protuberance when the pillion seat is mounted to the vehicle body wherein when the front portion of the pillion seat is raised out of engagement with the rider's seat while the rear portion of the pillion seat is secured to the vehicle and the rearward extension is extended through the hook opening, the hook bottom wall engages and bends the rear end of the rearward extension upwardly such that the engagement protuberance securely engages with the lock protuberance.

9. The seat support structure according to claim 8, wherein the bracket is plate shaped and is removably connected to the rider's seat.

10. The seat support structure for a saddle-riding vehicle according to claim 8, wherein the bottom plate is formed of synthetic resin.

11. The seat support structure for a saddle-riding vehicle according to claim 8, wherein the engagement protuberance is formed as an upward bend in the rear end of the rearward extension.

12. The seat support structure for a saddle-riding vehicle according to claim 8, wherein the engagement protuberance is spaced from the lock protuberance when the rear portion of the pillion seat is secured to the vehicle and the front portion of the pillion seat is disposed in engagement with the rider's seat.

13. The seat support structure for a saddle-riding vehicle according to claim 8, wherein the bracket further includes a pair of left and right rearward extensions disposed on opposite lateral sides of the bracket, wherein each of the extensions is formed into a flat plate longer in the vehicle longitudinal direction than in a vehicle width direction, and wherein a bottom plate of the pillion seat includes a pair of hooks which respectively receive rear ends of the pair of rearward extensions therethrough.

14. The seat support structure for a saddle-riding vehicle according to claim 8, wherein the rider's seat has a rear portion fixed to the vehicle body via a rider's seat bracket which is jointly fixed to the vehicle body with the bracket.

* * * * *